Patented Dec. 31, 1929

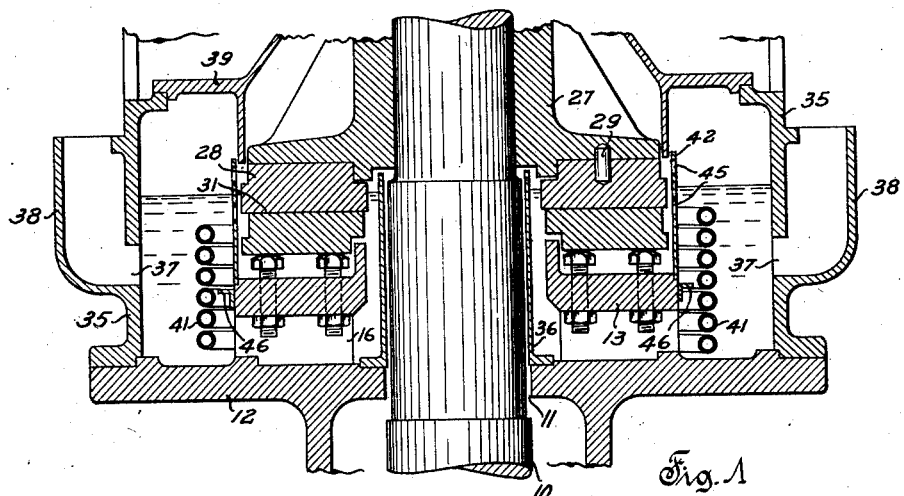
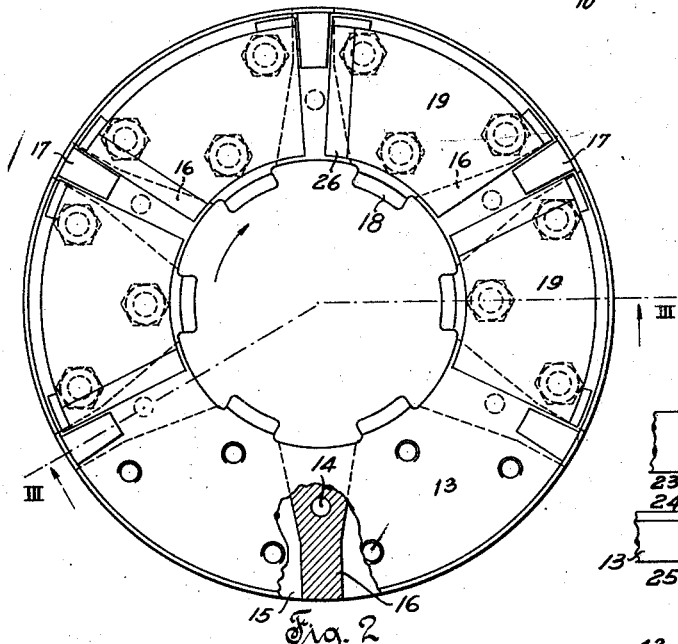
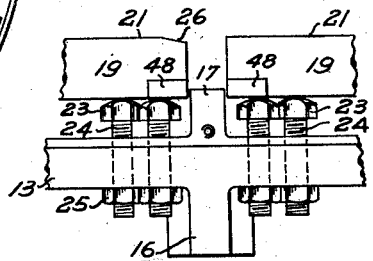
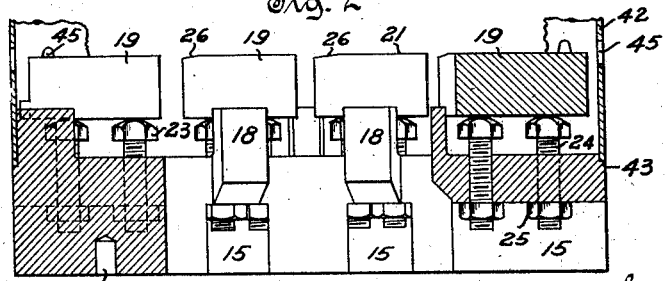

1,741,822

UNITED STATES PATENT OFFICE

ARTHUR J. BROWN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

THRUST BEARING

Application filed September 24, 1924. Serial No. 739,454.

This invention relates in general to bearings, and has particular relation to bearings, especially those of the thrust type, wherein special provisions are made for reducing friction through the production of a film of lubricating fluid under pressure between the relatively movable bearing surfaces.

It is an object of this invention to provide an improved thrust bearing wherein the parts of the relatively movable bearing elements are of special design and construction to facilitate the production and maintenance of the desired film of lubricating material under pressure between the active bearing surfaces, during the operation of the shaft with which the bearing is associated; and wherein one of the relatively movable bearing elements includes a plurality of bearing shoes or pads of such design and construction and so mounted as to facilitate the formation and maintenance of the desired pressure film of lubricating fluid during the operation of the movable bearing element and the shaft with which it is associated; and wherein each of the bearing pads or shoes is carried or supported by a plurality of adjustable supports adapted to provide for the proper adjustment of the entire bearing face of the shoes toward and away from the bearing face of the cooperative bearing element.

A further object of this invention is to provide a thrust bearing of the character indicated and embodying improved means for insuring or facilitating the proper and satisfactory cooling of the lubricating medium of the bearing.

These and other objects and advantages are attained by the present invention, various novel features of which will appear from the description and drawings herein, disclosing an embodiment of the invention, and will be more particularly pointed out in the claims.

In the accompanying drawings:

Fig. 1 is a fragmental vertical section of apparatus provided with a thrust bearing embodying features of the present invention.

Fig. 2 is a plan view of the stationary portion of the thrust bearing disclosed in Fig. 1.

Fig. 3 is a section taken in planes indicated by the line III—III of Fig. 2.

Fig. 4 is a fragmental elevational view of a detail of the stationary portion of the thrust bearing disclosed in Figs. 1, 2 and 3.

In the embodiment of the invention disclosed in the drawings, the shaft 10 of the machine, which may be considered a vertical shaft machine of any desired character, passes through a central opening 11 in a base or bearing support 12. An annular support or thrust collar 13, here shown as being in the form of a single piece annular collar of special design, is mounted on the support 12, being held against rotation and radial movement thereon in any suitable manner, as by means of a pin or dowel in one member cooperative with the walls of a slot in the other member, such a slot being indicated at 14, and a projection, annular or otherwise, on the support 12 which bears against a shouldered portion of the collar to prevent radial movement.

The underneath side of the annular support or collar 13 is undercut to provide a plurality of sector-shaped recesses 15 with sector-shaped partition walls 16 between the recesses. As indicated, these partitions and sector-shaped recesses are six in number, the partitions resting upon the support 12 and thus serving as the means for supporting the collar 13. On the upper side of the collar 13, spaced projections 17 are provided adjacent the outer periphery of the collar, these projections being preferably disposed axially opposite the supporting partitions 16 at the underneath side of the thrust collar. Along the radially inner periphery of the thrust collar 13 are provided offset, axial projections 18 extending upwardly beyond the normal upper face of the thrust collar. These projections 18 are the same in number as the projections 17 at the outer periphery of the collar and are disposed intermediate the projections 17.

The projections 17 and 18 constitute a boundary of broken outline for sector-shaped spaces, six in number and each adapted to loosely receive a sector-shaped bearing shoe or pad 19 having a machined upper bearing face 21. The radial edges of the bearing shoes 19 are adapted to abut the side walls of the projections 17 which confine and limit circumferential movement of the shoe in either direction, and the projections 18 are adapted to limit radially inward movement of the several shoes. Each bearing shoe is supported in operative position between the several sets of projections 17 and 18, by means of a plurality of adjustable supports, here shown in the form of bolts upon the heads 23 of which the shoes rest, the threaded shanks 24 of the bolts being adjustably mounted in threaded apertures in the shelf or body portion of the collar 13. One or more locking nuts 25 are secured upon the lower end of the threaded shanks of the supporting bolts, the upper faces of these nuts bearing against the underneath side of the shelf portion of the collar 13, thus serving to lock the bolts in any adjusted position.

As indicated, the preferred arrangement of adjustable supporting means for the several bearing shoes includes three adjusting bolts, one being adjacent each radial edge of the sector-shaped space 15 and the bearing shoe 19, in position to support the bearing shoe adjacent its outer periphery, and the third bolt being located adjacent the inner edge of the recesses and in position to support the bearing shoe at its inner periphery at a point substantially midway between the other two supporting bolts. This arrangement of the supporting bolts, with one supporting the shoe adjacent each radial edge along the outer periphery of the shoe and the third one supporting the shoe at a midpoint along its inner periphery, provides a balanced or symmetrical support for the shoe and thus insures the proper distribution of the load upon the several shoes. It is desirable that the upper bearing face of the head 23 of each of the supporting bolts be rounded, preferably along a spherical surface whose radius lies within the body of the bolt, this arrangement of a rounded bearing face insuring proper support of the bearing shoe even though all of the supporting bolts are not disposed parallel to the shaft and to each other. Because of the fact that the sector-shaped spaces 15 are open at their radially outer side, and especially with the spaced arrangement of the bolts as shown, a wrench or other adjusting tool can readily be inserted to such position and manipulated so as to secure the desired release and tightening of the locking nuts 25 and the adjustment of the supporting bolts.

Each of the bearing shoes 19 is preferably beveled along its leading radial edge, that is, considered with respect to the direction of rotation of the shaft, as indicated in Fig. 2, the beveled portion being indicated at 26. The beveling of this forward or leading edge of the shoes insures, during operation of the machine of which the bearing forms a part, the ready formation and maintenance of a desired wedge-shaped film of oil under pressure upon the bearing surface 21 of the bearing shoes.

An annular support or thrust collar 27 is connected or otherwise fixed to the shaft 10 to rotate therewith, and this collar carries or rests upon an annular bearing element 28 which may be in the form of a single piece ring or collar, the bearing element being connected in driving relation with and held against appreciable movement relative to the support 27, as by means of a pin and slot arrangement, indicated at 29. This bearing collar 28 has a machined bearing surface 31 on its underside which cooperates with the upper bearing surfaces 21 on the bearing shoes 19. The thrust of the shaft 10 and parts associated therewith is transmitted to the support for the relatively fixed bearing elements through the cooperative engagement between the movable element 28 and the relatively fixed bearing shoes 19.

A bearing housing 35 is supported upon the bearing support 12, being spaced from the support or collar 13 and the bearing elements 19 and 28. The annular support 12 is provided at its inner edge with a cylindrical tube or retainer 36 secured in position, as by having a flange thereon bolted to the support, and this tube is of such dimensions as to be entirely free of the shaft 10 and to extend above the plane of engagement of the bearing surface 31 with the bearing surfaces 21 of the shoes 19. The tube 36 thus acts as a dam for confining a body of oil in which the active bearing elements are immersed, the housing 35 being filled with oil to a point above the plane of the cooperative bearing surfaces of the fixed and movable bearing elements and below the upper edge of the tubular element 36. The side wall of the bearing housing is provided with one or more openings 37 communicating with ports 38, preferably formed integrally with the housing wall, which may serve as overflow or filling ports. A cover element 39 is provided for the bearing housing, this cover resting at its outer periphery on a seat formed on the housing wall and having a relatively inclined portion which may extend fairly close to the rotatable shaft or collar 27 thereon, and a substantially vertical downwardly extending projection or apron overlapping and in relatively close association with the upper end of the guard or barrier 42, mentioned hereinbelow, at its radially inner side.

A cooling coil 41 is disposed within the bearing housing adjacent but spaced from the outer periphery of the bearing elements 13, 19 and 28, this cooling coil being adapted to have a cooling fluid, such as water, circulated therethrough for the purpose of carrying off a portion of the heat of the oil or other lubricating fluid which passes over or through the cooling coil during conditions of ordinary operation of the bearing. A cylindrical guard or partition 42 is carried by the annular fixed support 13, being disposed between the cooling coil 41 and the outer periphery of the active bearing elements and relatively closely adjacent the rotatable active bearing element, the function of this guard being to prevent the passage of oil from the outer body portion of the housing immediately beneath and between the several fixed bearing shoes 19 to a point radially within these bearing shoes. This cylindrical guard or barrier is preferably secured in operative position by one or more screws or bolts passing through the guard and into the spaced projections 17 on the collar 13, the lower edge of the guard resting upon a ledge 43 formed at the outer periphery of the annular collar 13 adjacent its upper face. The guard 42 is provided with one or more series of apertures 45 substantially in line with and slightly above the plane of engagement between the bearing faces of the bearing element 28 and the bearing shoes 19. An additional function of the guard or barrier 42 during operation of the shaft and bearing is to confine the rotative movement or swirling of the oil in the housing, the latter being incident to the rotation of the movable part of the bearing, to a relatively thin annulus within the guard or barrier, the series of spaced holes 45 permitting the passage of sufficient oil to the body of the bearing housing to insure the desired circulation of fresh oil across the active bearing surfaces, but preventing the radially outward passage of a relatively large body of swirling oil. Thus, through the maintenance of a relatively quiet condition of the oil in the body of the bearing housing, the amount of oil foam or mist or vapor formed above the oil in the housing is reduced to a very considerable extent. And by reason of the fact that this guard or barrier 42 extends upwardly into overlapping and close association with the lower end of the downwardly projecting apron on the cover 39, the oil in the body of the housing is confined and the possibility of oil vapor, mist or the like passing off from such chamber is considerably reduced. An annular barrier 46 is disposed in position so as to substantially fill the space between the cooling coil 41 and the outer periphery of the annular collar 13, this barrier being preferably secured to the outer periphery of the collar 13, and having the function of substantially obstructing the passage of oil upwardly in the space between the cooling coil and the collar 13. A plurality of spaced pads 48 are provided at the outer periphery of the several bearing shoes 19, being adapted to bear against the guard 42 and thus limit radially outward movement of the shoes 19.

During operation of the bearing, oil is free to circulate through the spaces 15 in the collar 13 and upwards in the space between the tube 36 and the collar 13 and bearing shoes 19, being forced or drawn radially outwards with a circumferential component between the bearing shoes 19, entering the wedge-shaped spaces formed by the bevel 26 at the leading edges of the shoes, pressure being built up in these wedge-shaped spaces to facilitate or cause a film of flowing oil to be spread over the entire cooperative bearing faces, the pressure on this oil being ordinarily sufficient to actually lift the relatively movable bearing element 28 from actual contact with the bearing shoes 19 and to float it upon a comparatively thin film of oil which is forced over the flat or unbeveled portions of the shoes 19. This film of oil is under sufficient pressure, under normal conditions of operation, to maintain its lifting or floating effect upon the movable bearing element 28 and permitting the latter to rotate without actual metal to metal contact with the bearing shoes 19. This is a desirable action of this class of thrust bearings, for this floating of the movable bearing element out of actual engagement with the fixed bearing element through the action of a film of oil under pressure, causes a great reduction in the frictional losses in the bearing.

As a stream or film of oil under more or less pressure leaves the cooperative bearing surfaces of the bearing elements 28 and 19, a greater portion of this oil passes through the openings 45 in the barrier 42, passing thence into the body portion of the oil reservoir in the housing. This oil which is now relatively hot has a natural circulatory movement downward to replace oil drawn from the bottom of the reservoir and forced through or between the bearing surfaces. In passing downward and along the bottom of the reservoir, the heated oil passes over and through the cooling coil 41, the effect thereof being to relieve the oil of a considerable portion of its heat before it passes through the spaces 15 at the underside of the collar 13, whence it passes upward between the tube 36 and the active bearing elements and is again forced outward between the active bearing surfaces. The oil guard 42 prevents the oil passing from the body of the reservoir radially inward through the cooling coil and the spaces between the bearing shoes and the collar 13; and the barrier 46 prevents any upward local circulation in the space between the cooling coil and the collar 13. The general provisions with respect to the cooling coil and the barriers 42 and 46 is such as to provide a very desirable circulatory movement and cooling of the oil during operation of the bearing, to the end of maintaining the oil at a satisfactory operating temperature.

With the bearing construction described hereinabove, especially as to the feature of a series of bearing shoes 19 each provided with a plurality of adjustable supports, it is possible to secure such preliminary adjustment of the bearing as insures that the weight of the rotary shaft and parts associated therewith is properly distributed and balanced upon the stationary part of the thrust bearing, each shoe thereof taking its appropriate share of the weight throughout its entire bearing surface or any selected portion thereof. As a possible means of further facilitating the entrance of oil to the cooperative bearing surfaces and the formation of the desired wedge-shaped films of oil under pressure, the radially outer adjustable supporting bolt at the leading edge of each bearing shoe, or the adjustable support at the inner periphery of each shoe, or both of these adjustable supports may be lowered slightly beyond the adjustable support at the trailing edge of the shoe, so as to provide a slight tilting of the entire bearing face of the shoe toward the leading edge of the radially inner edge thereof; or the desired result as to tilting the bearing face of the shoe may be secured by merely raising slightly the outer adjustable support at the trailing edge of the shoe. However, satisfactory operating results may be secured with all unbeveled portions of the bearing faces of the shoes in a single plane parallel to the bearing face 31 of the rotatable bearing element 28. With the normal bearing surfaces of the bearing shoes substantially in a single plane, the formation of the desired wedge-shaped films at the leading edges of the shoes may be readily secured and maintained during operation of the bearing, with a bevel which extends back from the leading edge to an extent less than one-fifth of the circumferential length of the shoe.

It should be understood that the invention claimed is not limited to the exact details of design and construction shown and described herein, for obvious modifications or embodiments and other uses will be apparent to persons skilled in the art.

It is claimed and desired to secure by Letters Patent:

1. A thrust bearing for a rotatable shaft, comprising a rotatable bearing element carried by the shaft, a supporting element, a series of independently mounted bearing shoes cooperative with said rotatable bearing element and adapted to carry the thrust of said shaft in the direction of its axis, and a plurality of rigid, definitely positioned and independently adjustable supports bearing on said supporting element and each of said bearing shoes and adapted to permit adjustment of the operative positions of the several bearing shoes.

2. A thrust bearing for a rotatable shaft, comprising a rotatable bearing element carried by the shaft, a supporting element, an annularly arranged series of bearing shoes cooperative with said rotatable bearing element and adapted to carry the thrust of the shaft in the direction of its axis, and a plurality of rigid, definitely positioned and independently adjustable supports at least three in number bearing on said supporting element and one of said shoes and adapted to permit adjustment of the operative position of the bearing face of said shoe.

3. A bearing, comprising a supporting element, a series of independently mounted bearing shoes, and a plurality of rigidly mounted and independently adjustable and symmetrically disposed supports arranged out of alinement with one another and at least three in number bearing on said supporting element and each of said shoes and adapted to permit adjustment of the operative positions of the bearing faces of said shoes.

4. A thrust bearing, comprising a supporting element, an annularly arranged series of bearing shoes, and a plurality of rigid, definitely positioned and independently adjustable supports bearing on said supporting element and one of said shoes and adapted to permit adjustment of the operative position of the bearing face of said shoe, the surface of each of said adjustable supports on which said bearing shoe rests being formed to permit some degree of universal relative motion of said shoe on said support.

5. A thrust bearing, comprising a supporting element recessed at its rear face, an annularly arranged series of bearing shoes, and a plurality of definitely positioned, independently adjustable and symmetrically disposed supports bearing on said supporting element and on each of said bearing shoes and adapted to permit adjustment of the operative position of the bearing face of said shoes, said adjustable supports passing through a portion of said supporting element into the recess thereof at the rear face thereof, and means cooperative with portions of said adjustable supports which pass through said supporting element for maintaining said supports in adjusted position.

6. A thrust bearing, comprising relatively rotatable, cooperative bearing elements, one of said bearing elements comprising an annular supporting collar, and a plurality of bearing shoes, each of said shoes being supported upon a plurality of rigid, definitely positioned and independently adjustable supports carried by said annular collar during operation of the movable bearing element.

7. A thrust bearing, comprising relatively rotatable, cooperative bearing elements, one of said bearing elements comprising an annular supporting collar, and a plurality of bearing shoes, each of said shoes being supported upon a plurality of rigid and independently adjustable supports carried by said annular collar during operation of the movable bearing element, said adjustable supports being in the form of headed bolts having rounded bearing surfaces for engagement with said bearing shoes.

8. A thrust bearing, comprising relatively rotatable, cooperative bearing elements, one of said bearing elements comprising an annular supporting collar, and a plurality of bearing shoes, each of said shoes being supported upon a plurality of rigid, definitely positioned and independently adjustable supports carried by said annular collar, said supports being at least three in number and disposed out of alinement.

9. A thrust bearing, comprising relatively rotatable, cooperative bearing elements, one of said bearing elements comprising an annular supporting collar, and a plurality of bearing shoes, each of said shoes being supported upon a plurality of rigidly mounted, symmetrically disposed and independently adjustable supports carried by said annular collar, said supports being at least three in number and disposed out of alinement.

10. A thrust bearing, comprising an oil-containing housing, relatively fixed and movable bearing elements within said housing, said fixed bearing element comprising a supporting element, a plurality of bearing shoes, rigid and independently adjustable supports carried by said supporting element, each of said shoes being mounted in operative position on an individual group of said supports during operation of the movable bearing element, and releasable locking means cooperative with said adjustable supports and adapted to lock said supports in adjusted position, said adjustable supports and said locking means being adjustable while said bearing is in operative position.

11. A thrust bearing, comprising an oil-containing housing, relatively fixed and movable bearing elements within said housing, said fixed bearing element comprising a supporting element having spaced projections at one side providing intermediate recesses and spaced projections at its opposite side adjacent the outer periphery of said element, a plurality of bearing shoes disposed between said latter projections, and a plurality of independently adjustable supports carried by said supporting element and adapted to support said bearing shoes in adjusted position.

12. A thrust bearing, comprising an oil-containing housing, relatively fixed and movable bearing elements within said housing, said fixed bearing element comprising a supporting element having spaced projections at one side providing intermediate recesses and spaced projections at its opposite side adjacent the outer periphery of said element and at its inner periphery at points intermediate said outer peripheral projections, a plurality of bearing shoes disposed between said latter projections, and a plurality of independently adjustable supports carried by said supporting element and adapted to support said bearing shoes in adjusted position.

13. A thrust bearing, comprising an oil-containing housing, relatively fixed and movable bearing elements within said housing, said fixed bearing element comprising a supporting element having spaced projections at one side providing intermediate recesses and spaced projections at its opposite side adjacent the outer periphery of said element, a plurality of bearing shoes disposed between said latter projections, a plurality of independently adjustable supports carried by said supporting element and adapted to support said bearing shoes in adjusted position, and releasable locking means cooperative with each of said adjustable supports and said supporting element and adapted to lock said supports in adjusted position, said adjustable supports and said locking means being adjustable from a point laterally outside of said supporting element while the cooperative bearing elements are in operative position.

14. A thrust bearing, comprising an oil-containing housing, relatively fixed and movable bearing elements within said housing, said fixed bearing element comprising a supporting element, a cooling device within said housing radially outside of and spaced from said bearing elements and spaced to a substantial degree from the wall of said housing, and a cylindrical barrier radially within said cooling device and fixedly mounted in operative position and extending upwardly past the cooperative bearing surfaces of said fixed and movable bearing elements in proximity to but spaced from the latter and to a point above the normal oil level in said housing and permitting flow of oil from said cooperative bearing surfaces to the outer portion of said housing, and a cover for the oil space in said housing having a depending apron with a portion in close association with the upper portion of said barrier to enclose the air space above the oil in said housing.

15. A thrust bearing, comprising an oil-containing housing, relatively fixed and movable bearing elements within said housing, said fixed bearing element comprising a supporting element, a cooling device within said housing radially outside of and spaced from said bearing elements and spaced to a substantial degree from the wall of said housing, a cylindrical barrier radially within said cooling device and fixedly mounted in operative position and extending upwardly past the cooperative bearing surfaces of said fixed and movable bearing elements in proximity to but spaced from the latter and to a point above the normal oil level in said housing and permitting flow of oil from said cooperative bearing surfaces to the outer portion of said housing, and means for preventing through upward circulation of oil between said cooling device and the outer periphery of said bearing elements, and a cover for the oil space in said housing having a depending apron with a portion in close association with the upper portion of said barrier to enclose the air space above the oil in said housing.

16. In a thrust bearing, a supporting element, and an annular series of mechanically separate and spaced bearing shoes having their bearing faces normally substantially in the same plane, three rigid and independently adjustable supports for each of said shoes, said supports being carried by said supporting element and arranged out of alinement with one another, and each of said shoes resting upon its supports during operation of said bearing, each of said shoes having its bearing face beveled at the leading edge thereof to provide a wedge-shaped recess between that portion of the bearing face and the cooperative face of a relatively movable bearing element.

17. A thrust bearing, comprising a supporting element, an annularly arranged series of bearing shoes, and a plurality of the spaced supports carried by said supporting element, at least two of said supports being cooperative with and affording rigid support for each of said shoes during operation of said bearing, one of the supports for each shoe being definitely positioned and adjustable and permitting adjustment of the operative position of the bearing face of said shoe.

18. A bearing, comprising a rotatable element, a supporting member, and a bearing shoe, and a plurality of definitely positioned supports at least three in number and out of alinement with each other and carried by said supporting member and affording rigid support for said shoe during operation of said rotatable element, one of said supports being adjustable on said supporting member to predetermined positions with respect to the others of said supports whereby said shoe is caused to assume during operation of said bearing a position which permits the formation of a wedge-shaped film of oil between the bearing face of said shoe and said rotatable element.

19. A thrust bearing, comprising an oil-containing housing, relatively fixed and movable bearing elements within said housing, a cylindrical barrier fixedly mounted in operative position and extending upwardly past the cooperative bearing surfaces of said fixed and movable bearing elements in proximity to but slightly spaced from the latter and to a point above the normal oil level in said housing and permitting flow of oil from said cooperative bearing surface to the outer body portion of said housing, and a cover for the oil space in said housing having a portion in close association with the upper portion of said barrier to enclose the air space above the oil in said housing.

20. A thrust bearing, comprising an oil-containing housing, relatively fixed and movable bearing elements within said housing, a cylindrical barrier fixedly mounted in operative position and extending upwardly past the cooperative bearing surfaces of said fixed and movable bearing elements in proximity to but slightly spaced from the latter and to a point above the normal oil level in said housing and permitting flow of oil from said cooperative bearing surface to the outer body portion of said housing, and a cover for the oil space in said housing having a depending apron with a portion disposed radially within the upper end of said barrier and in close association therewith to enclose the air space above the oil in said housing.

In testimony whereof, the signature of the inventor is affixed hereto.

ARTHUR J. BROWN.